(12) United States Patent
Beckmann et al.

(10) Patent No.: US 11,579,922 B2
(45) Date of Patent: Feb. 14, 2023

(54) DYNAMIC GRAPHICAL PROCESSING UNIT REGISTER ALLOCATION

(71) Applicant: Advanced Micro Devices, Inc., Santa Clara, CA (US)

(72) Inventors: Bradford Michael Beckmann, Redmond, WA (US); Steven Tony Tye, Boxborough, MA (US); Brian L. Sumner, Bellevue, WA (US); Nicolai Hähnle, Munich (DE)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/136,725

(22) Filed: Dec. 29, 2020

(65) Prior Publication Data

US 2022/0206841 A1    Jun. 30, 2022

(51) Int. Cl.
| | |
|---|---|
| *G06F 9/48* | (2006.01) |
| *G06F 9/38* | (2018.01) |
| *G06F 9/30* | (2018.01) |
| *G06F 15/80* | (2006.01) |
| *G06F 11/30* | (2006.01) |

(52) U.S. Cl.
CPC ........ *G06F 9/4843* (2013.01); *G06F 9/30098* (2013.01); *G06F 9/3836* (2013.01); *G06F 11/3006* (2013.01); *G06F 11/3024* (2013.01); *G06F 15/80* (2013.01)

(58) Field of Classification Search
CPC .................................................... G06F 9/4843
See application file for complete search history.

(56) References Cited

U.S. PATENT DOCUMENTS

| | | | |
|---|---|---|---|
| 2007/0288909 A1* | 12/2007 | Cheung | G06F 9/3879 717/136 |
| 2013/0205123 A1* | 8/2013 | Vorbach | G06F 9/30076 712/221 |
| 2016/0026507 A1* | 1/2016 | Muckle | G06F 9/5094 718/104 |

OTHER PUBLICATIONS

Beckmann et al., U.S. Appl. No. 17/136,738, entitled "Management of Thrashing in a GPU", filed Dec. 29, 2020, 50 pages.
Jeon et al., "GPU Register File Virtualization", MICRO-48: Proceedings of the 48th International Symposium on Microarchitecture, Dec. 2015, pp. 420-432.

(Continued)

*Primary Examiner* — Michael J Metzger
(74) *Attorney, Agent, or Firm* — Kowert Hood Munyon Rankin and Goetzel PC; Rory D. Rankin

(57) ABSTRACT

Systems, apparatuses, and methods for dynamic graphics processing unit (GPU) register allocation are disclosed. A GPU includes at least a plurality of compute units (CUs), a control unit, and a plurality of registers for each CU. If a new wavefront requests more registers than are currently available on the CU, the control unit spills registers associated with stack frames at the bottom of a stack since they will not likely be used in the near future. The control unit has complete flexibility determining how many registers to spill based on dynamic demands and can prefetch the upcoming necessary fills without software involvement. Effectively, the control unit manages the physical register file as a cache. This allows younger workgroups to be dynamically descheduled so that older workgroups can allocate additional registers when needed to ensure improved fairness and better forward progress guarantees.

20 Claims, 14 Drawing Sheets

(56) References Cited

OTHER PUBLICATIONS

Kloosterman et al., "Regless: Just-In-Time Operand Staging for GPUs" MICRO-50 '17: Proceedings of the 50th Annual IEEE/ACM International Symposium on Microarchitecture, Oct. 2017, pp. 151-164.

Vijaykumar et al., "Zorua: A Holistic Approach to Resource Virtualization in GPUs", 2016 49th Annual IEEE/ACM International Symposium on Microarchitecture (MICRO), Oct. 2016, 14 pages.

* cited by examiner

DYNAMIC GRAPHICAL PROCESSING UNIT REGISTER ALLOCATION

BACKGROUND

Description of the Related Art

A graphics processing unit (GPU) is a complex integrated circuit that performs graphics-processing tasks. For example, a GPU executes graphics-processing tasks required by an end-user application, such as a video-game application. GPUs are also increasingly being used to perform other tasks which are unrelated to graphics. The GPU can be a discrete device or can be included in the same device as another processor, such as a central processing unit (CPU).

In many applications executed by a GPU, a sequence of work-items, which can also be referred to as threads, are processed so as to output a final result. In one implementation, each processing element executes a respective instantiation of a particular work-item to process incoming data. A work-item is one of a collection of parallel executions of a kernel invoked on a compute unit. A work-item is distinguished from other executions within the collection by a global ID and a local ID. A subset of work-items in a workgroup that execute simultaneously together on a compute unit can be referred to as a wavefront, warp, or vector. The width of a wavefront is a characteristic of the hardware of the compute unit. As used herein, the term "compute unit" is defined as a collection of processing elements (e.g., single-instruction, multiple-data (SIMD) units) that perform synchronous execution of a plurality of work-items. The number of processing elements per compute unit can vary from implementation to implementation. A "compute unit" can also include a local data store and any number of other execution units such as a vector memory unit, a scalar unit, a branch unit, and so on. Also, as used herein, a collection of cooperating wavefronts are referred to as a "workgroup".

A typical application executing on a GPU relies on function inlining and static reservation of registers to a workgroup. Currently, GPUs expose registers to the machine instruction set architecture (ISA) using flat array semantics and statically reserve a specified number of physical registers before the wavefronts of a workgroup begin executing. This static array-based approach underutilizes physical registers and effectively requires in-line compilation, making it difficult to support many modern programming features. In some cases, the register demands of the wavefronts leave the compute units underutilized. Alternatively, applications which limit register use must often spill to memory leading to performance degradation and extra contention for memory bandwidth.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
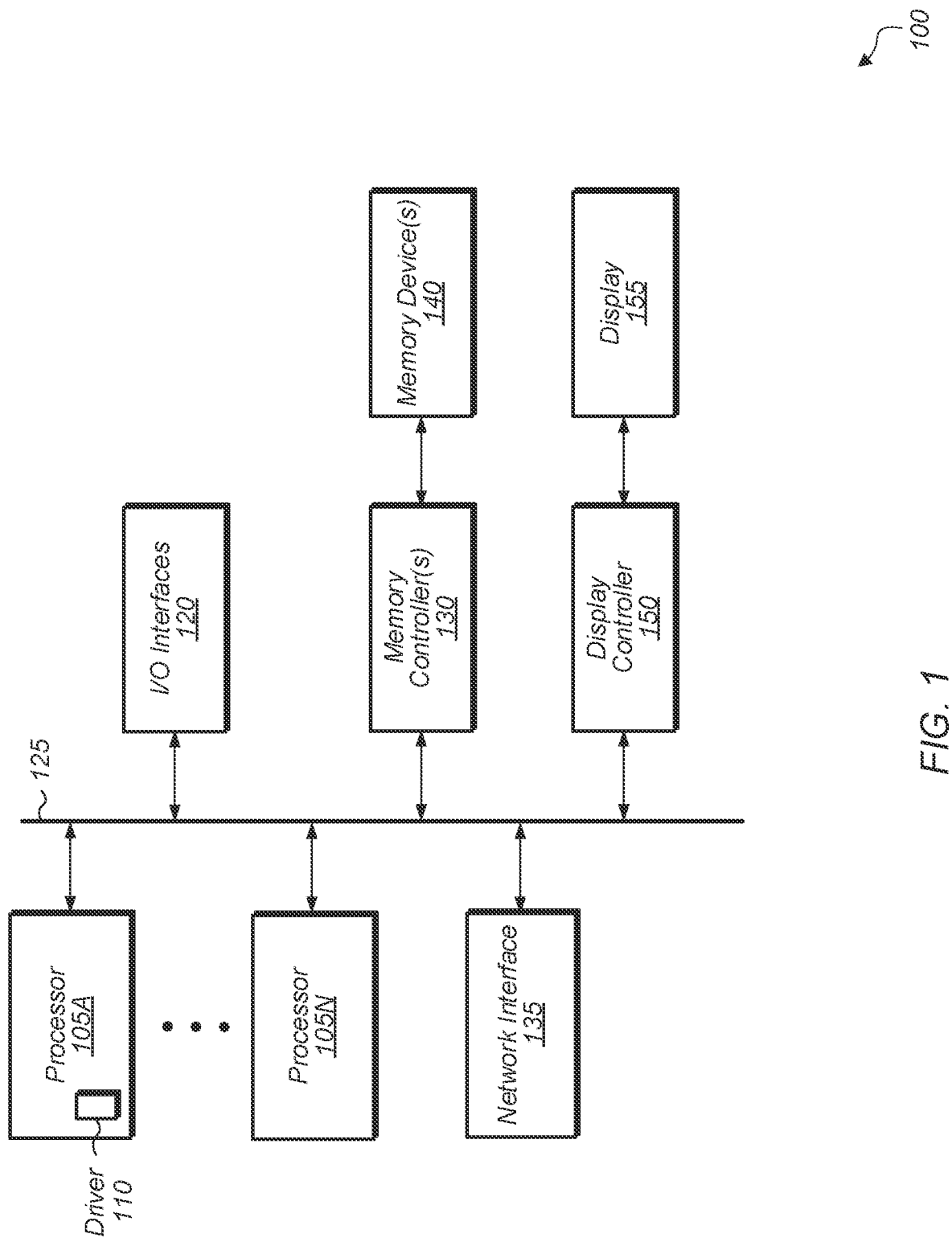
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for dynamic register allocation are disclosed. In one implementation, a system includes at least a host processing unit (e.g., central processing unit (CPU)) and a parallel processing unit (e.g., graphics processing unit (GPU)) for executing a plurality of wavefronts in parallel. In one implementation, the parallel processing unit includes a command processor, a dispatch unit, a control unit, and a plurality of compute units. The command processor receives kernels from the host processing unit and communicates with the dispatch unit to dispatch corresponding wavefronts to the compute units.

In one implementation, if a new wavefront requests more registers than are currently available on the CU, the control unit spills registers associated with stack frames at the bottom of a stack since they will not be used in the near future and should be the first entries spilled to memory. The control unit determines how many registers to spill based on dynamic demands and prefetches upcoming necessary fills without software involvement. Effectively, the control unit manages the physical register file as a cache in this implementation.

In one implementation, in order to enable dynamic register allocation for workgroups, registers are referenced using stack semantics. Also, younger workgroups are dynamically descheduled so that older workgroups can allocate additional registers when needed to ensure improved fairness and better forward progress guarantees. In one implementation, dynamic register allocation instructions are executed so as to allocate a dynamic frame of registers. Also, synchronization instructions are executed to identify when a workgroup is waiting for certain communication events and can be descheduled to participate in cooperative scheduling.

During runtime, a wavefront might not need as many registers at a given moment in time as were statically allocated to the wavefront at launch. Typically, a compiler statically allocates a number of registers that the wavefront will use in the worst-case scenario. To mitigate this scenario, mechanisms and methods are presented herein which allow for dynamically managing the registers available to a wavefront as needed. This reduces the amount of registers that are allocated to a wavefront at launch, enabling more wavefronts to be executed concurrently on the processing unit. For example, in one implementation, when a wavefront makes a function call, additional registers can be assigned to the wavefront if the given function uses a relatively large number of registers. When the given function completes execution, the additional registers are deallocated and potentially assigned to other wavefronts. It is noted that the proposed mechanisms are not solely tied to or executed as part of a function call and return. For example, in one implementation, upon entry, a function may need a certain number of registers, then at some point either release some registers or ask for more registers. Also, the final deallocation as the function returns does not need to be built into the return instruction itself.

In one implementation, if an older wavefront needs additional registers, but a younger wavefront is using a relatively large number of registers, the registers can be deallocated from the younger wavefront and provided to the older wavefront so that the older wavefront can make forward progress. This can help avoid a deadlock scenario where the GPU deadlocks if the older wavefront is not able to make forward progress due to the resources being utilized by younger wavefronts. This also allows younger wavefronts to be launched when an older wavefront is waiting for a synchronization event since the younger wavefronts can be descheduled as needed to permit the older wavefront to be resumed.

In one implementation, the control unit monitors the dispatch of wavefronts to the compute units. Also, the control unit dynamically assigns registers to newly dispatched wavefronts to better manage the available registers. This is in contrast to statically assigning a fixed amount of registers to wavefronts at dispatch. During execution of a wavefront, each time a function is called within the wavefront, a set of registers are allocated to the function being called. If not enough registers are available for the new function, then one or more stack frames are spilled to memory. Preferably, the lowest stack frames on the stack are spilled to memory since the corresponding functions are less likely to be accessed in the near future. When the callee function finishes execution and execution returns to the caller function, the registers are returned to the free pool for use by other stack frames.

In one implementation, the control unit manages the dynamic scheduling and descheduling of wavefronts based on resource availability of the processing unit (e.g., GPU). In one implementation, the goal of the control unit is to maximize the performance and/or throughput of the processing unit performing meaningful work while ensuring forward progress is maintained. If the control unit schedules too many wavefronts on the compute units, the wavefronts will be competing for resources and may not make sufficient forward progress. For example, if wavefronts are spilling registers to memory and then having to restore registers from memory, this writing and reading data back and forth from memory does not translate to making forward progress in the execution of a workload. Also, in some cases, if a newer wavefront is brought onto the processing unit to execute while an older wavefront is descheduled, the newer wavefront could eventually be stalled waiting for a result from the older wavefront. This could result in a deadlock where the newer wavefront stalls and prevents the older wavefront from being brought back to execute on the processing unit.

In one implementation, in order to prevent excessive thrashing while still ensuring the processing unit's resources are being fully utilized, the control unit tracks the number of wavefront registers that are spilled per epoch. If the number of wavefront registers spilled per epoch exceeds a threshold, then the control unit reduces the number of wavefronts that are allowed to be scheduled and dispatched in the next epoch. This allows the control unit to determine the optimal rate at which wavefronts should be scheduled to take advantage of the available resources while avoiding excessive resource contention. Training may be conducted over a series of epochs in which for each epoch the totality or a subset of the training data set is repeated, often in random order of presentation, and the process of repeated training epochs is continued until the accuracy of the network reaches a satisfactory level. As used herein, an "epoch" refers to a period of time (e.g., a number clock cycles, transactions, etc.).

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which renders pixel data representing an image to be provided to display controller 150 to be driven to display 155.

In one implementation, system 100 executes a ray tracing workload which use dynamic loading of libraries where shaders process a stream of scenes. In other implementations, system 100 executes other types of workloads which rely on the dynamic loading of libraries. While the prior art relies on inline compilation and static reservation of registers to a workgroup, the methods and mechanisms described herein enable dynamic register allocation for workgroups. The prior art exposes registers to the machine instruction set architecture (ISA) using flat array semantics and statically reserves a specified number of physical registers before the waves of a workgroup begin executing. While simple, this static array-based approach underutilizes physical registers and effectively requires in-line compilation, making it difficult to support many modern programming features unless conservative function calling conventions are introduced. In contrast, the dynamic register allocation techniques using stack semantics described herein enable improved utilization and better programming language support.

In one implementation, dynamic register allocation involves sharing registers between the workgroups executing on the same compute unit. In another implementation, dynamic register allocation register involves allocating a fixed pool of registers to each wavefront and allowing unique frames (i.e., function calls) to dynamically manage that pool. However, the register demand of each frame can leave the physical register file underutilized and excessive spilling to memory can lead to performance degradation. As used herein, the term "spill" is defined as storing one or more register values of locations in the physical register file to memory so as to make those physical register file locations available for storing values for other variables.

In one implementation, the technique of descheduling lower priority (i.e., younger) workgroups so that they relinquish their registers and allow higher priority workgroups to proceed can lead to deadlock when younger work-groups are involved in inter-work-group synchronization (i.e., holding a lock). Furthermore, frequent significant changes in the number of registers assigned per workgroup can lead to excessive workgroup context swapping and extra contention for memory bandwidth. Prior art techniques use flat array-based register access semantics which provide hardware little context on which registers are most likely to be accessed first. In contrast, the improved techniques described herein combine cooperative scheduling techniques, dynamically adjusting the rate at which workgroups are assigned to compute units, and stack semantics for accessing registers. The combination of these techniques ensures that applications are guaranteed to make forward progress and avoid excessive context swapping.

Memory controller(s) 130 are representative of any number and type of memory controllers accessible by processors 105A-N. While memory controller(s) 130 are shown as being separate from processor 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), Graphics Double Data Rate 6 (GDDR6) Synchronous DRAM (SDRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
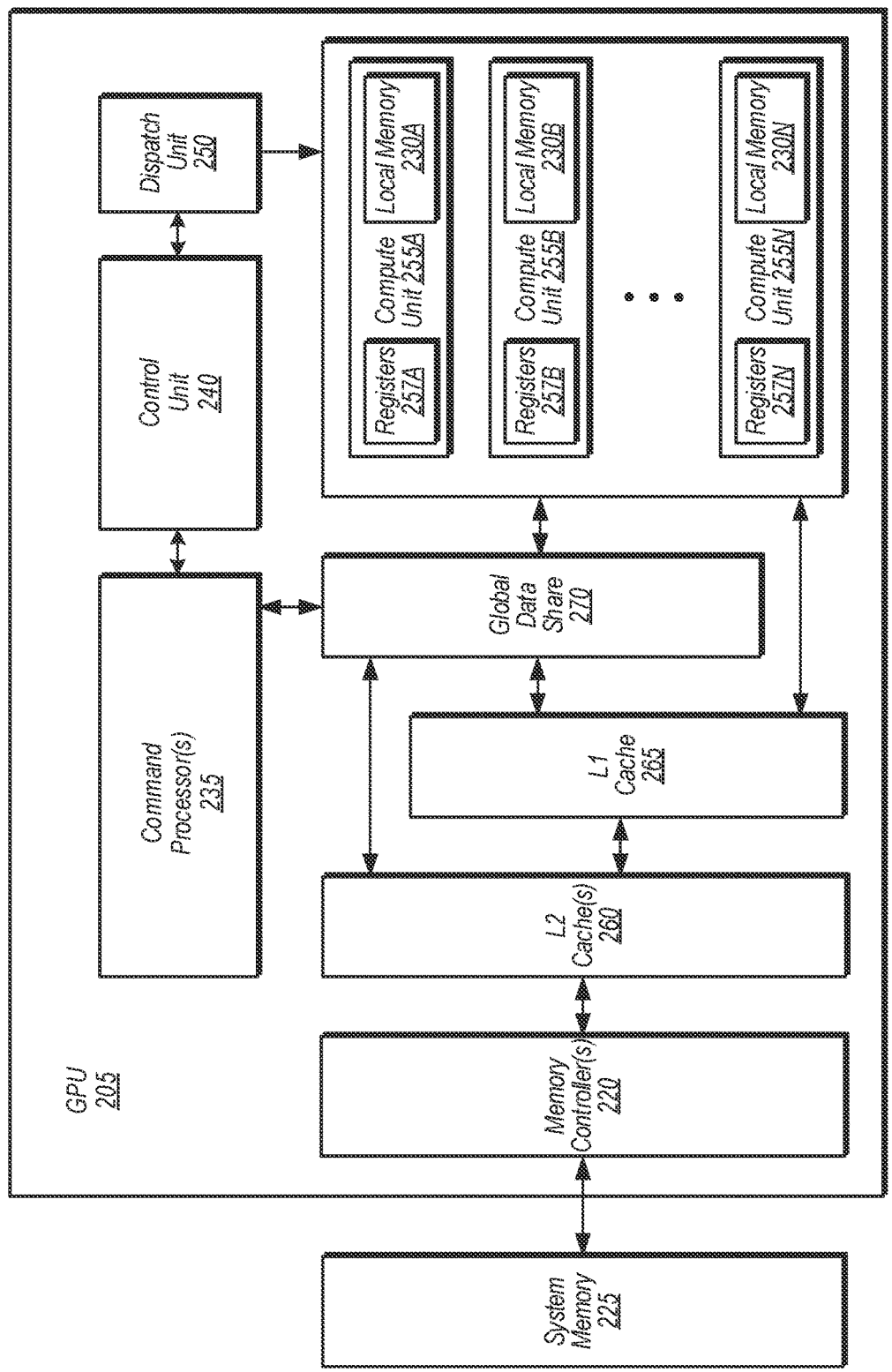
FIG. 2 is a block diagram of another implementation of a computing system.

Turning now to FIG. 2, a block diagram of another implementation of a computing system 200 is shown. In one implementation, system 200 includes GPU 205 and system memory 225. System 200 also includes other components which are not shown to avoid obscuring the figure. GPU 205 includes at least command processor(s) 235, control unit 240, dispatch unit 250, compute units 255A-N, memory controller(s) 220, global data share 270, shared level one (L1) cache 265, and level two (L2) cache(s) 260. It should be understood that the components and connections shown for GPU 205 are merely representative of one type of GPU. This example does not preclude the use of other types of GPUs (or other types of parallel processors) for implementing the techniques presented herein. In other implementations, GPU 205 includes other components, omits one or more of the illustrated components, has multiple instances of a component even if only one instance is shown in FIG. 2, and/or is organized in other suitable manners. Also, each connection shown in FIG. 2 is representative of any number of connections between components. Additionally, other connections can exist between components even if these connections are not explicitly shown in FIG. 2.

In various implementations, computing system 200 executes any of various types of software applications. As part of executing a given software application, a host CPU (not shown) of computing system 200 launches kernels to be executed by GPU 205. Command processor(s) 235 receive kernels from the host CPU and use dispatch unit 250 to dispatch wavefronts of these kernels to compute units 255A-N. In one implementation, control unit 240 includes circuitry for dynamically allocating registers 257A-N to dispatched wavefronts at call boundaries. However, in other implementations, register allocation and deallocate can occur at other points in time which are unrelated to call or return boundaries. Threads within wavefronts executing on compute units 255A-N read and write data to corresponding local memory 230A-N, registers 257A-N, global data share 270, shared L1 cache 265, and L2 cache(s) 260 within GPU 205. It is noted that L1 cache 265 can include separate structures for data and instruction caches. It is also noted that global data share 270, shared L1 cache 265, L2 cache(s) 260, memory controller 220, system memory 225, and local memory 230 can collectively be referred to herein as a "memory subsystem". It should be understood that when registers 257A-N are described as being spilled to memory, this can refer to the values being written to any location or level within the memory subsystem.

Figure 3:
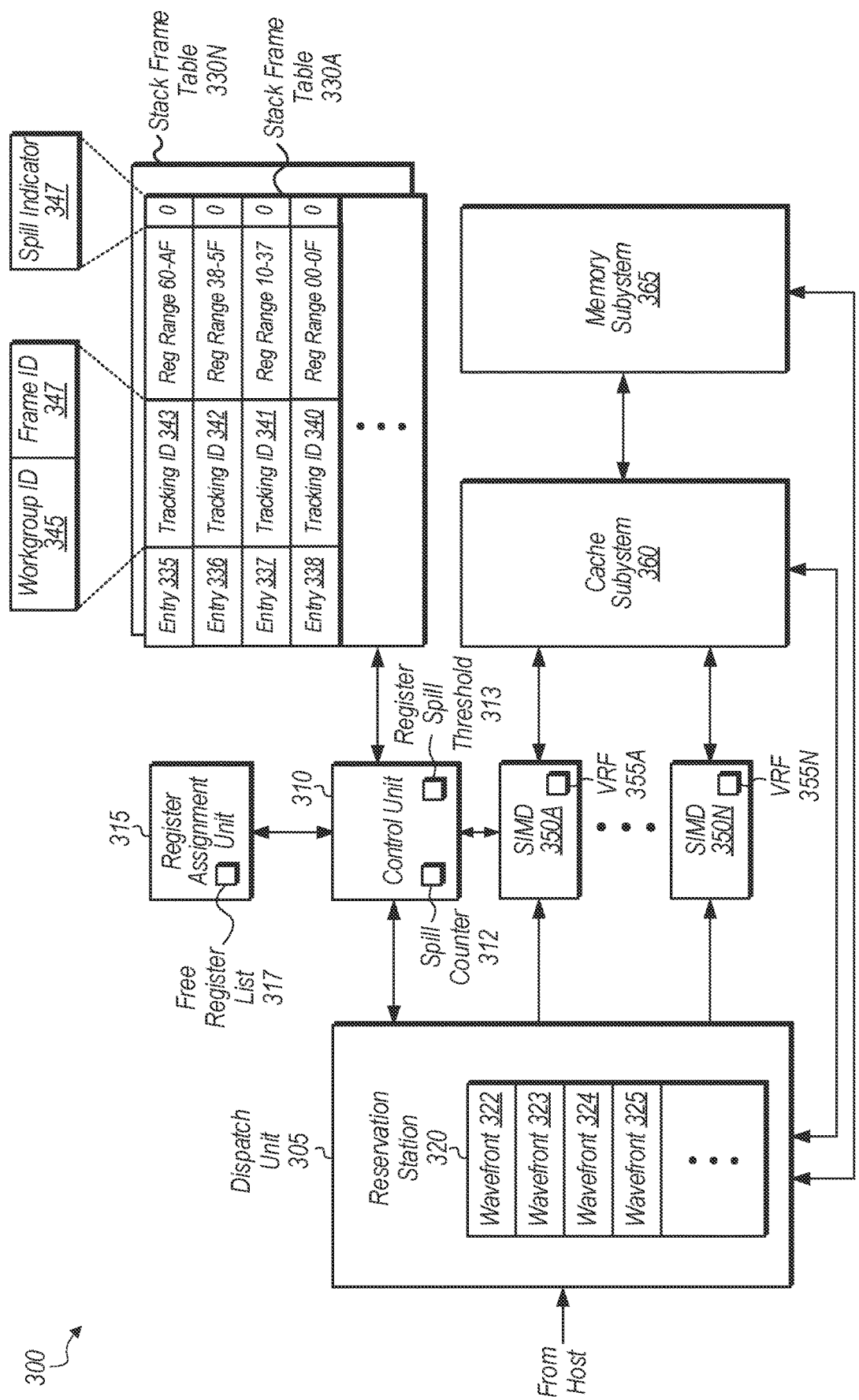
FIG. 3 is a block diagram of one implementation of a compute unit.

Referring now to FIG. 3, a block diagram of one implementation of a compute unit 300 is shown. In one implementation, the components of compute unit 300 are included within compute units 255A-N of GPU 205 (of FIG. 2). It should be understood that compute unit 300 can also include other components (e.g., wavefront scheduler) which are not shown to avoid obscuring the figure. Also, it is noted that the arrangement of components shown for compute unit 300 are merely indicative of one particular implementation. In other implementations, compute unit 300 can have other arrangements of components.

In one implementation, dispatch unit 305 receives wavefronts from a command processor (e.g., command processor 235 of FIG. 2) for launching on single-instruction, multiple-data (SIMD) units 350A-N. SIMD units 350A-N are representative of any number of SIMD units, with the number varying according to the implementation. In one implementation, dispatch unit 305 maintains reservation station 320 to keep track of in-flight wavefronts. As shown in FIG. 3, reservation station 320 includes entries for wavefronts 322, 323, 324, and 325, which are representative of any number of outstanding wavefronts. It should be understood that the number of outstanding wavefronts can vary during execution of an application. It is noted that reservation station 320 can also be referred to as ordered list 320 where the wavefronts are ordered according to their relative age.

In one implementation, when dispatch unit 305 is getting ready to launch a new wavefront, dispatch unit 305 queries control unit 310 to determine an initial number of registers to allocate to the new wavefront. In this implementation, control unit 310 queries register assignment unit 315 when determining how to dynamically allocate registers at the granularity of the functions of wavefronts. In one implementation, register assignment unit 315 includes free register list 317 which includes identifiers (IDs) of the registers of vector register file (VRF) 355A-F that are currently available for allocation. If there are enough registers available in free register list 317 for a new function of a wavefront, then control unit 310 assigns the initial frame to these registers. Otherwise, if there are insufficient registers available in free register list 317 for the new function, then control unit 310 will deallocate (i.e., spill) registers of one or more stack frames of in-flight wavefront functions. As used herein, the term "stack frame" is defined as the input parameters, local variables, and output parameters of a given function. A new stack frame is created by a function call, and the stack frame is automatically deallocated on a return from the function call. It is noted that it is not necessary to couple register allocation and deallocation to functional call boundaries.

In order to determine which registers to spill to cache subsystem 360 and/or memory subsystem 365, control unit 310 queries stack frame tables 330A-N. In one implementation, a separate stack frame table 330A-N is maintained for each separate wavefront executing on compute unit 300. In another implementation, a separate stack frame table 330A-N is maintained for each VRF 355A-N of a corresponding SIMD 350A-N. Each stack frame table 330A-N identifies where a function's stack frame is stored in VRF 355A-N. While the set of stack frame tables 330A-N can be used in one implementation to track the mapping of stack frames to register locations in VRF 355A-N, this does not preclude the use of other mechanisms to track where stack frames for the various wavefront functions are stored in VRF 355A-N. Accordingly, other techniques for tracking how stack frames are mapped to register locations are possible and are contemplated. It is noted that the terms "stack frame", "register frame", and "allocated register frame" can be used interchangeably herein.

In one implementation, in order to determine which stack frame(s) to deallocate and spill, control unit 310 selects values based on a relative age of the stack frames in the register file. For example, in one implementation the control unit 310 determines which values in the stack frame table 330 correspond to the youngest in-flight wavefront, with the youngest in-flight wavefront identified by reservation station 320. For example, in one implementation, assuming that stack frame table 330A corresponds to the youngest in-flight wavefront, control unit 310 selects the lowest (i.e., oldest) stack frame (i.e., the stack frame that is furthest from the top of the table 330A) that does not have a spill indicator field 347 set. In this example, entry 338 with tracking ID 340 is the furthest from the top of table 330A. Accordingly, control unit 310 would deallocate the registers, from range 00-0F, specified by entry 338 after verifying that its spill indicator field 347 is not set. It is noted that each entry 335-338 can also include any number of additional fields which are not shown in stack frame table 330A to avoid cluttering the figure.

When the registers from range 00-0F are deallocated, the spill indicator field 347 for entry 338 is set and the values stored by these registers are written back to memory subsystem 365. In one implementation, a pre-reserved memory in a known location is used for storing the register stack frame in memory. If more registers are needed than are available from range 00-0F, then control unit 310 would move up the stack frame table 330A to entry 337 for the function with tracking ID 341, continuing to entry 336 for the function with tracking ID 342, and then on to entry 335 for the function with tracking ID 343. As shown from the expanded area above tracking ID 343, tracking ID 343 is created from the concatenation of workgroup ID 345 and frame ID 347. The tracking ID's of the other entries can also be generated from the concatenation of the workgroup ID and the frame ID of the corresponding function. In one implementation, the frame ID is determined by the value of a frame counter (not shown) when a function is called. An example of a frame counter 430 for generating frame IDs is described in further detail in the discussion associated with FIG. 4.

If a group of registers are deallocated (i.e., spilled) for a wavefront function, then control unit 310 increments spill counter 312. At the end of every epoch, control unit 310 compares spill counter 312 to register spill threshold 313. The duration of an epoch can vary from implementation to implementation. If the spill counter 312 is greater than the register spill threshold 313 at the end of an epoch, then control unit 310 causes the launching of new workgroups to be throttled. In other words, the rate at which new workgroups are launched in a new epoch is reduced if the spill counter 312 is greater than the register spill threshold 313 for the previous epoch. The spill counter 312 is reset at the end of each epoch.

After registers are dynamically allocated for a new wavefront function by control unit 310, the stack frame for the new wavefront function is stored in the assigned registers of VRF 355A-N. Also, a new entry is added to the top of the corresponding stack frame table 330A-N to identify the range of registers that are allocated to the wavefront function's stack frame. In one implementation, each stack frame table 330A-N is a first-in, first-out (FIFO) buffer. In one implementation, the new entry includes a workgroup ID field 340 and frame ID field 345 which identify the specific wavefront, as shown in the expanded box for tracking ID 343 of entry 335 of stack frame table 330A. In other implementations, other ways of identifying a specific wavefront function can be used in each entry of stack frame tables 330A-N.

When a new wavefront is launched on SIMD units 350A-N by dispatch unit 305, an entry for the new wavefront is added to reservation station 320. When a given wavefront finishes execution, the entry in reservation station 320 for the given wavefront is retired, and the stack frame table 330A-N corresponding to the given wavefront is freed up for use by other wavefronts. Also, when a wavefront is retired, its registers will be returned to free register list 317 of register assignment unit 315. These registers will then be available for any new wavefronts that are dispatched to SIMD units 350A-N by dispatch unit 305.

It is noted that the arrangement of components such as dispatch unit 305, control unit 310, and register assignment unit 315 shown in FIG. 3 is merely representative of one implementation. In another implementation, dispatch unit 305, control unit 310, and register assignment unit 315 are combined into a single unit. In other implementations, the functionality of dispatch unit 305, control unit 310, and register assignment unit 315 can be partitioned into other units in varying manners. Also, it is noted that the reference numerals A-N for different components do not necessarily mean that there are the same number of units of these different components. For example, the number "N" of SIMD units 350A-N can be different from the number "N" of stack frame tables 330A-N.

Figure 4:
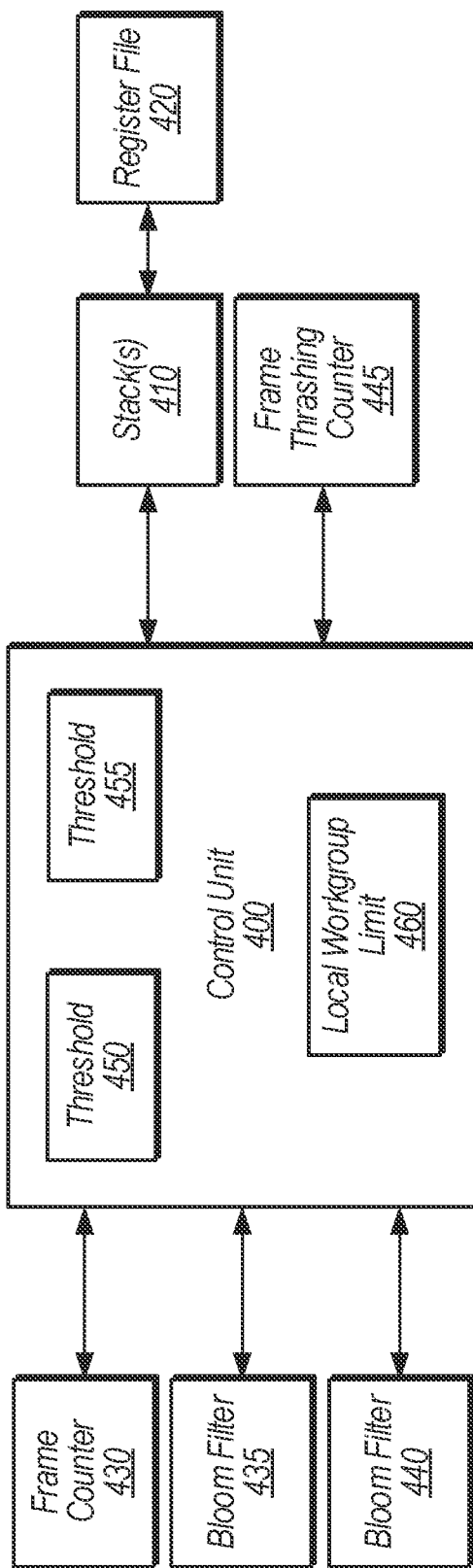
FIG. 4 is a block diagram of one implementation of a compute unit.

Turning now to FIG. 4, a block diagram of one implementation of a control unit 400 is shown. In one implementation, the components and functionality of control unit 400 are included in compute unit 300 (of FIG. 3). In one implementation, control unit 400 detects when stack frames associated with the same wavefronts are continuously spilled and restored. When the spilling and restoring of stack frames reaches a threshold level, control unit 400 attempts to limit this resource contention by reducing the number of workgroups that are dispatched per epoch. Various mechanisms for tracking the spilling and restoring of stack frames are depicted in FIG. 4. However, it should be understood these are intended to be non-limiting examples of resource contention tracking mechanisms.

In one implementation, each workgroup is assigned a unique identifier (ID) and each frame is identified by the value of frame counter 430 when the frame is pushed onto a corresponding stack 410. In one implementation, frame counter 430 that is incremented every time a frame is pushed onto a stack 410 and decremented every time a frame is popped from the stack 410. In one implementation, the contents of stack(s) 410 are mirrored into register file 420 on a frame by frame basis at wavefront function call boundaries. In one implementation, the top of each stack 410 is maintained in register file 420 by spilling the lowest entries of stack 410 to memory (not shown) to make room for new frames pushed onto stack 410.

In one implementation, the unique workgroup ID and the value of frame counter 430 when a frame is pushed onto stack 410 are concatenated together and hashed into one of two counting bloom filters 435 and 440. As used herein, a "bloom filter" is defined as a probabilistic data structure used to test whether an element is a member of a set. In one implementation, bloom filter 435 tracks recently spilled frames and bloom filter 440 tracks recently allocated frames. When a frame is spilled or allocated, the opposite bloom filter is checked. For example, if a frame is spilled, bloom filter 440 is checked. Or, if a frame is allocated, bloom filter 435 is checked. If there is a hit when either bloom filter 435 or 440 is checked, then frame thrashing counter 445 is incremented. At the end of each epoch, the frame thrashing counter 445 is compared to threshold 450. If the threshold 450 is reached, then control unit 400 decrements the number of workgroups permitted to be assigned per epoch. The frame thrashing counter 445 and bloom filters 435 and 440 are reset at the end of each epoch.

In various implementations, control unit 400 adjusts the spilling policies of workgroups based on tracking the thrashing of registers among workgroups. In one implementation, each compute unit (e.g., compute unit 300 of FIG. 3) starts out in least recently used (LRU) spilling mode, with LRU spilling mode selecting the registers of the least recently executed workgroup to spill to memory when more registers are needed. In one implementation, if bloom filters 435 and 440 detect thrashing above threshold 455, then the compute unit is switched into "spill from the youngest workgroup" mode. In "spill from the youngest workgroup" mode, control unit 400 selects registers to be spilled from the youngest in-flight workgroup when registers need to be allocated to a newly dispatched workgroup.

In one implementation, if thrashing is not detected for a given number of epochs, the compute unit switches back into "LRU spilling" mode and gives the younger workgroups a new chance to run by spilling frames of older workgroups that have not been accessed in the longest time relative to the other in-flight workgroups. In one implementation, the above mechanism is refined by a local workgroup limit 460 that is decreased on thrashing and increased when no thrashing occurs. In this implementation, if the local workgroup limit 460 is equal to "N", then the "N" oldest workgroups are allowed to allocate stack frames on a corresponding compute unit even when this requires spilling. In this case, younger workgroups' frames are preferably spilled, and younger workgroups are forbidden from causing another workgroup to spill. As used herein, the term "local workgroup limit" is defined as a number of the oldest workgroups that are allowed to allocate stack frames on a given compute unit. In another implementation, the younger workgroups are forbidden from allocating stack frames altogether. In a further implementation, rather than using local workgroup limit 460, the mechanism references a workgroup limit which is determined based on frame thrashing counter 445 and bloom filters 435 and 440.

It is noted that the arrangement of components in FIG. 4 are indicative of one particular implementation. In other implementations, other arrangements of components can be used. Also, it should be understood that control unit 400 can also be coupled to various other components which are not shown to avoid obscuring the figure.

Figure 5:
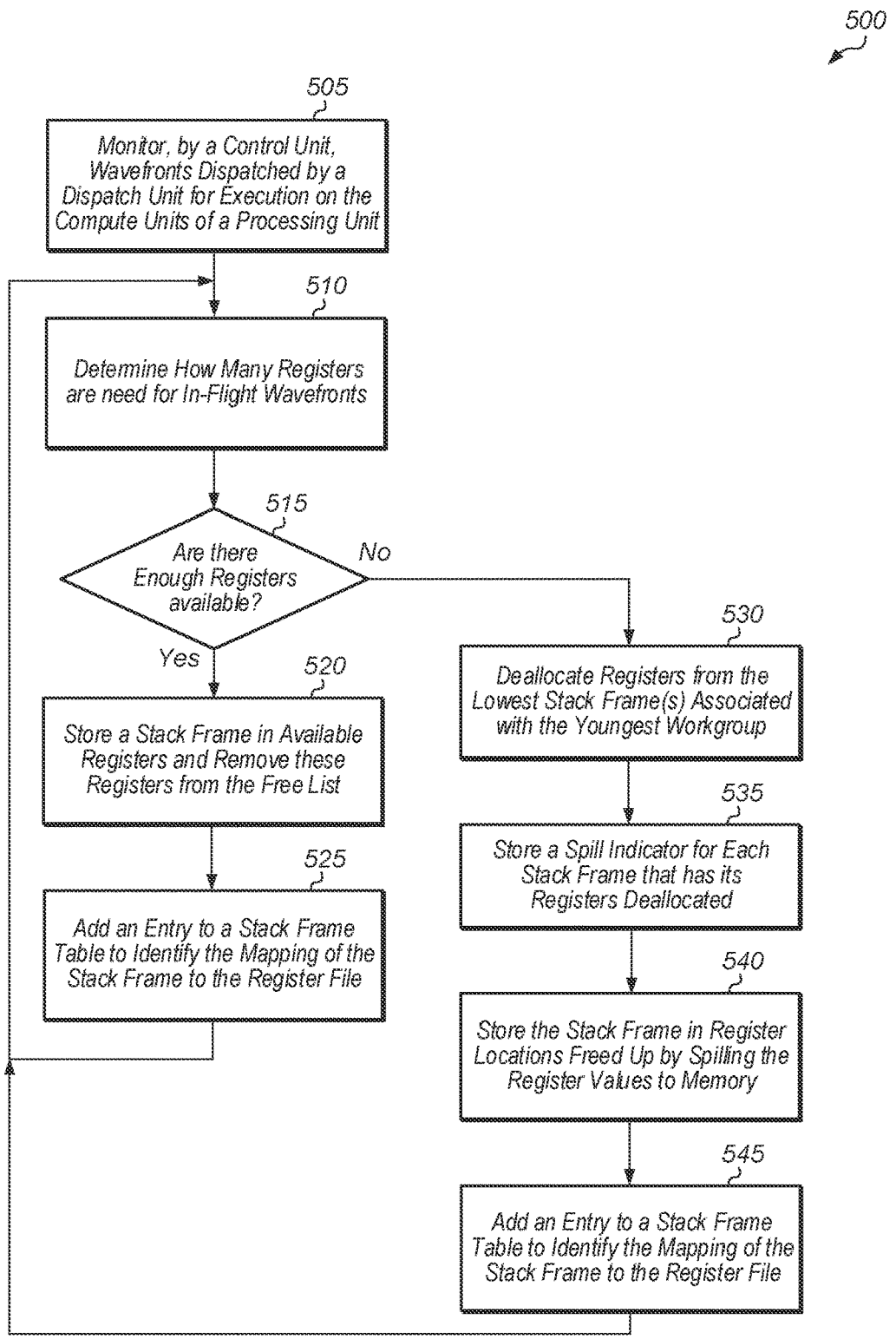
FIG. 5 is a generalized flow diagram illustrating one implementation of a method for dynamic register allocation.

Referring now to FIG. 5, one implementation of a method 500 for dynamic register allocation is shown. For purposes of discussion, the steps in this implementation and those of FIG. 6-14 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A control unit (e.g., control unit 240 of FIG. 2) monitors wavefronts dispatched by a dispatch unit (e.g., dispatch unit 250) for execution on the compute units (e.g., compute units 255A-N) of a processing unit (e.g., GPU 205) (block 505). When needed by a wavefront, the control unit determines how many registers are needed (block 510). In one implementation, when a function call is detected, the control unit determines how many registers the callee function needs. In one implementation, the callee function includes an indication, generated by a compiler, indicating how many registers it needs. In other implementations, other ways of determining how many registers the callee function needs are possible and are contemplated. It is noted that in other implementations, the register allocation and deallocation decisions can be decoupled from function call and return boundaries.

Next, the control unit determines if there are enough available registers (e.g., to allocate to the callee function) (conditional block 515). If there are enough available registers to allocate (conditional block 515, "yes" leg), then the control unit stores the stack frame in available registers and removes these registers from the free list (block 520). In one implementation, the available registers are a contiguous range in the register file. The control unit also adds an entry to a data structure such as a stack table or otherwise (e.g., for the callee function) to identify the mapping of the stack frame to the register file (block 525). After block 525, method 500 returns to block 510.

If there are not enough available registers to allocate to the callee function (conditional block 515, "no" leg), then the control unit deallocates registers from the lowest stack frame(s) associated with the youngest workgroup (block 530). If the lowest frame(s) have enough registers for the callee function, then the control unit will only deallocate registers for the lowest frame(s). If the new wavefront needs more registers than are available from the youngest workgroup, then the control unit deallocates registers for the next youngest workgroup. The control unit can keep moving through the workgroups until enough registers have been deallocated. The control unit stores a spill indicator for each frame that has its registers deallocated (block 535). Next, the control unit stores the stack frame for the callee function in register locations freed up by spilling the register values to memory (block 540). The control unit also adds an entry to a stack table for the callee function to identify the mapping of the stack frame to the register file (block 545). After block 545, method 500 returns to block 510. It is noted that while the above contemplates allocating and deallocating registers based on function calls and returns, this need not be the case. In some embodiments, a device program may have different stages with each using a different number of registers. However, through the use of inlining or other design techniques, the entire program may consist of only a single function (e.g., a main function). The methods and mechanisms described herein are applicable to these and other embodiments.

Figure 6:
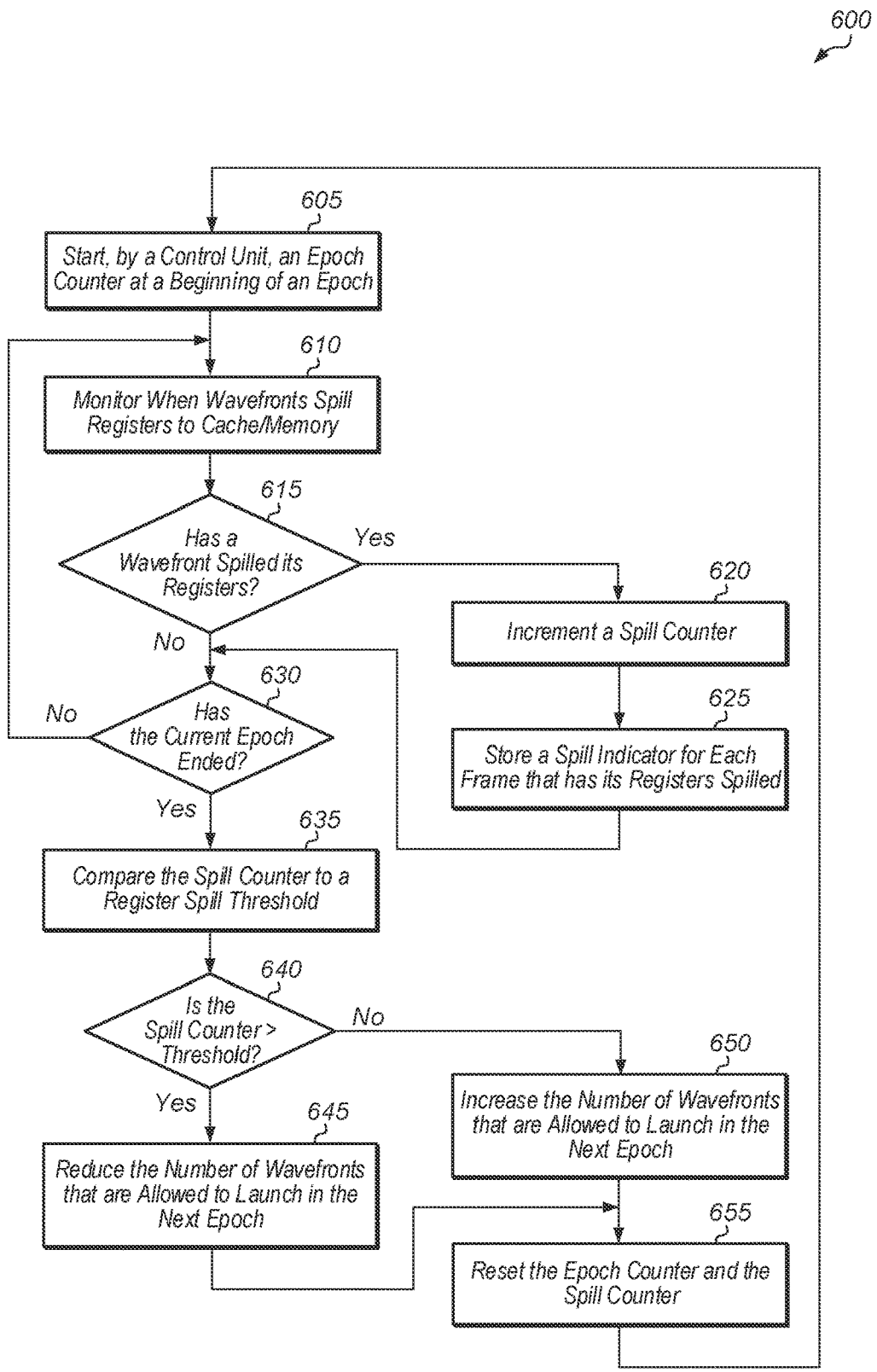
FIG. 6 is a generalized flow diagram illustrating one implementation of a method for determining when to throttle the launching of new workgroups.

Turning now to FIG. 6, one implementation of a method 600 for determining when to throttle the launching of new workgroups is shown. A control unit starts an epoch counter at a beginning of an epoch (block 605). During the epoch, the control unit monitors when wavefronts spill registers to cache/memory (block 610). Each time a wavefront spills its registers (conditional block 615, "yes" leg), the control unit increments a spill counter (e.g., spill counter 312 of FIG. 3) (block 620) and stores a spill indicator for each frame that has its registers spilled (block 625).

If the control unit does not detect a wavefront having spilled its registers (conditional block 615, "no" leg), then the control unit determines if the epoch has ended (conditional block 630). If the end of the epoch has been reached (conditional block 630, "yes" leg), then the control unit compares the spill counter to a register spill threshold (block 635). If the spill counter is greater than the register spill threshold (conditional block 640, "yes" leg), then the control unit reduces the number of new wavefronts that are launched in the next epoch (block 645). Otherwise, if the spill counter is less than or equal to the register spill threshold (conditional block 640, "no" leg), then the control unit increases the number of new wavefronts that are allowed to launch in the next epoch (block 650). It is noted that if the number of new waveforms allowed to launch has already reached a maximum value or a wavefront launch threshold, then the number of new waveforms that are allowed to launch in the next epoch can remain the same in block 650. After blocks 645 and 650, the control unit resets the epoch and spill counters (block 655), and then method 600 returns to block 605.

Figure 7:
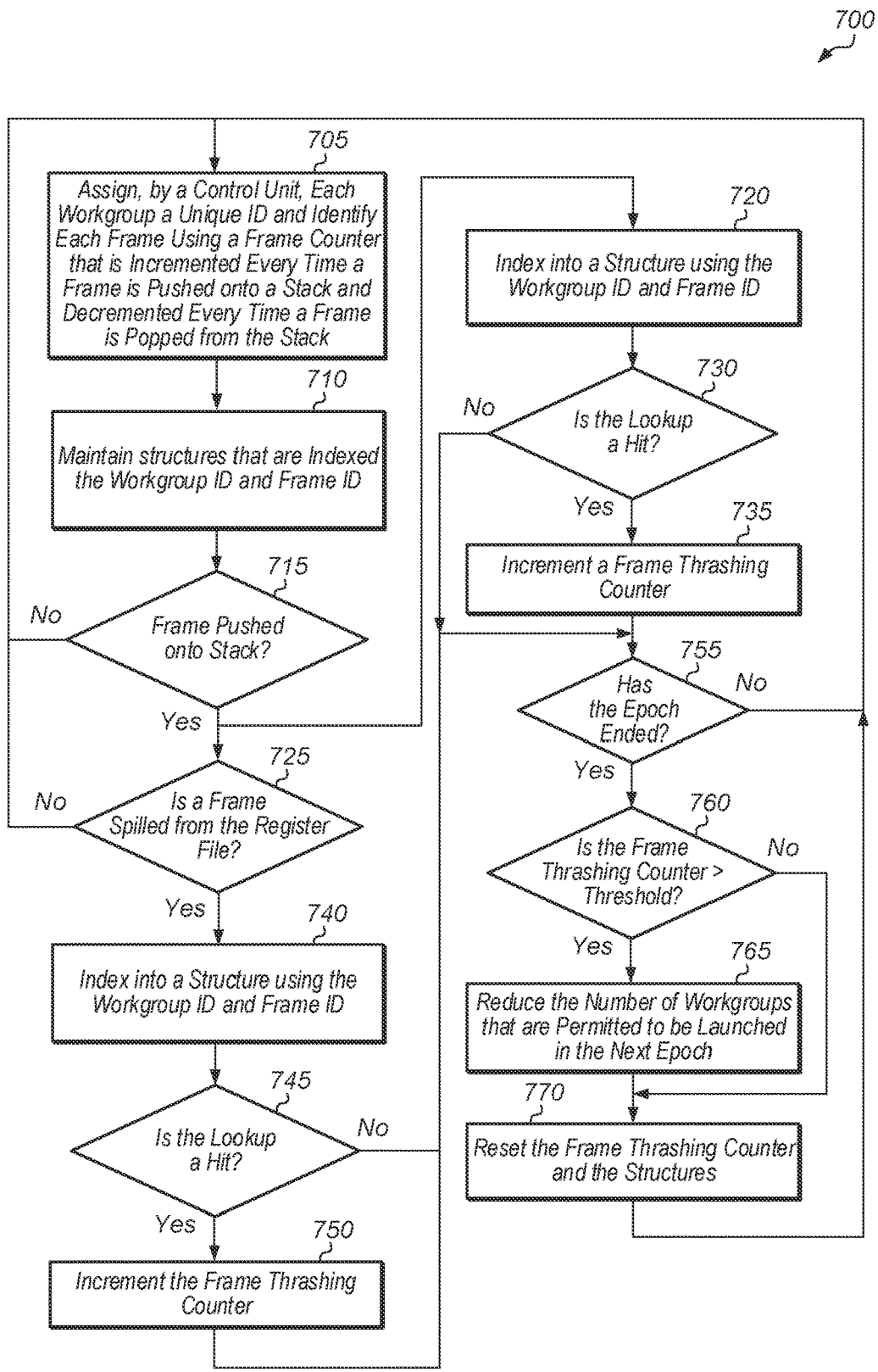
FIG. 7 is a generalized flow diagram illustrating one implementation of a method for adjusting the number of workgroups permitted to be assigned.

Referring now to FIG. 7, one implementation of a method 700 for adjusting the number of workgroups permitted to be assigned is shown. A control unit assigns each workgroup a unique identifier (ID) and identifies each frame using a frame counter that is incremented every time a frame is pushed onto a stack and decremented every time a frame is popped from the stack (block 705). The control unit maintains two bloom filters that are indexed by concatenating the workgroup ID with the frame ID for a corresponding frame (block 710). If a function is called and a frame is pushed onto the stack (conditional block 715, "yes" leg), then the workgroup ID concatenated with the frame ID of the new frame is hashed into a first bloom filter (block 720). In other implementations, other ways of generating an ID can be used for uniquely identifying the new frame, and this ID can be hashed into the first bloom filter in block 730. Also, if, as a result of the frame being pushed onto the stack (conditional block 715, "yes" leg), a previous frame is spilled from the register file (conditional block 725, "yes" leg), then the workgroup ID concatenated with the frame ID of the previous frame is hashed into a second bloom filter (block 740). In other implementations, other ways of generating an ID can be used for uniquely identifying the previous frame, and this ID can be hashed into the second bloom filter in block 740.

If the lookup of the first bloom filter results in a hit (conditional block 730, "yes" leg), then a frame thrashing counter is incremented (block 735). If the lookup of the second bloom filter results in a hit (conditional block 745, "yes" leg), then the frame thrashing counter is incremented (block 750). Next, if the end of an epoch has been reached (conditional block 755, "yes" leg), then the frame thrashing counter is compared to a threshold (conditional block 760). The value of the threshold can vary according to the implementation. If the frame thrashing counter is greater than the threshold (conditional block 760, "yes" leg), then the control unit reduces the number of workgroups that are permitted to be launched in the next epoch (block 765). Next, the bloom filter counters and the epoch counter are reset (block 770), and then method 700 returns to block 705.

It is noted that variations to the above steps of method 700 are possible and are contemplated. For example, in one implementation, the address of memory to which registers are spilled and restored is used as a key when accessing the probabilistic data structure (e.g., bloom filter). In one implementation, the control unit writes to the probabilistic data structure during spilling and reads from the probabilistic data structure during restoring. In one implementation, the number of wavefronts that are allowed to execute concurrently is decreased in the control unit after a period in which thrashing is detected. Also, the number of wavefronts that are allowed to execute concurrently is increased after a period in which no thrashing is detected. In one implementation, the detection is based on some threshold, and the threshold for increasing the number of wavefronts allowed to execute concurrently can be different from the threshold for decreasing the number of wavefronts allowed to execute concurrently. In one implementation, wavefront execution limits are determined individually per compute unit. In one implementation, a single per-compute-unit wavefront execution limit is determined based on feedback from all compute units, and applied equally to all of them.

Figure 8:
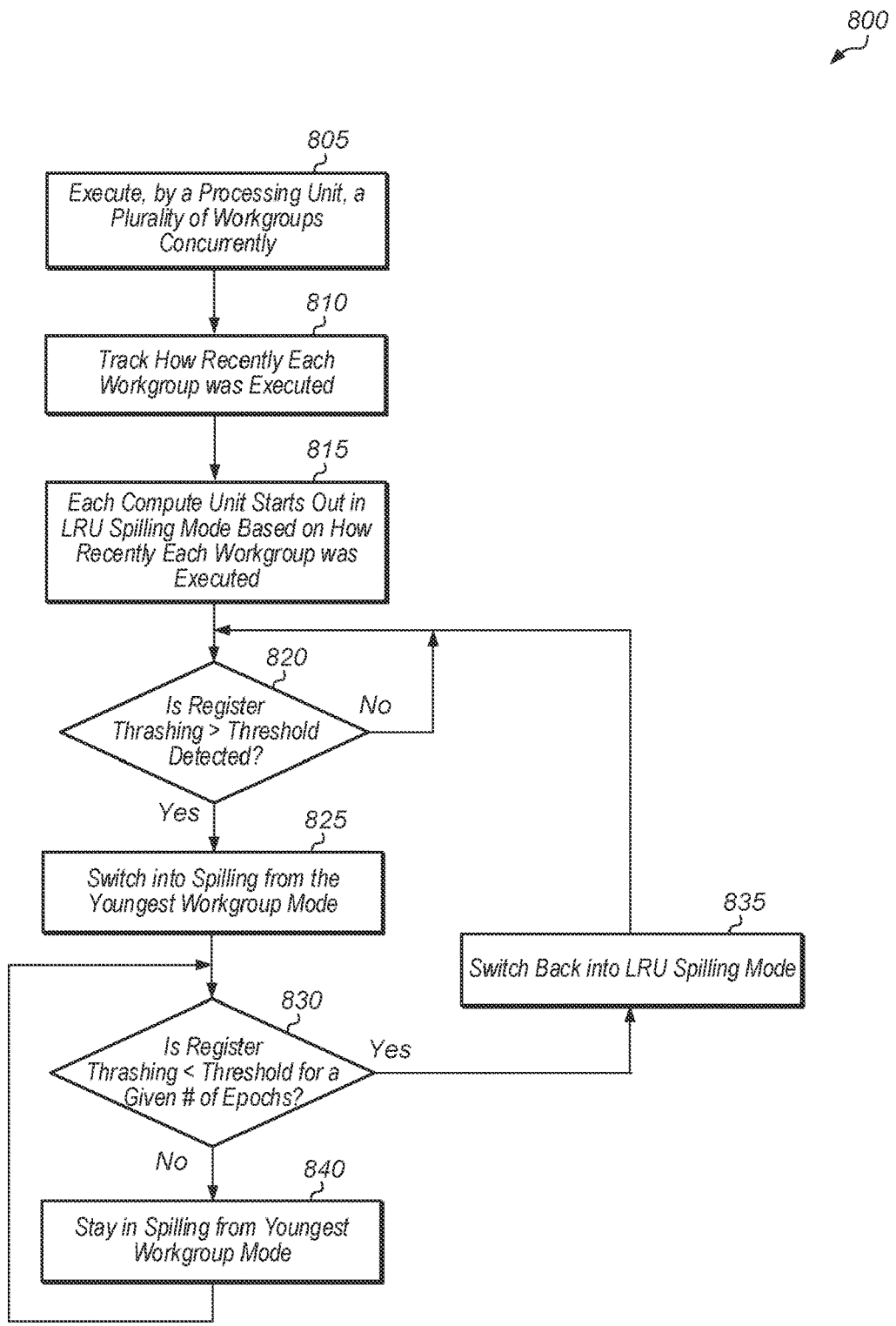
FIG. 8 is a generalized flow diagram illustrating one implementation of a method for switching between spilling modes.

Turning now to FIG. 8, one implementation of a method 800 for switching between spilling modes is shown. A processing unit (e.g., GPU 205 of FIG. 2) executes a plurality of workgroups concurrently (block 805). A control unit tracks how recently each workgroup was executed (block 810). Each compute unit (e.g., compute unit 300 of FIG. 3) starts out in least recently used (LRU) spilling mode based on how recently each workgroup was executed (block 815). In LRU spilling mode, a compute unit spills registers from the least recently executed workgroup regardless of the age of the workgroup. LRU spilling mode allows younger workgroups to use registers previously allocated to older workgroups that are stalled. In other words, stalled older workgroups have their assigned physical register locations deallocated so that these register locations can be used by younger workgroups.

Next, if register thrashing above a threshold is detected (conditional block 820, "yes" leg), then the compute units switch into spilling from the youngest workgroup mode (block 825). The threshold can be specified in terms of a number of register/frame spills per epoch, with the threshold amount varying from implementation to implementation. In the spilling from the youngest workgroup mode, the compute units spill from the youngest workgroup that is in-flight on the processing unit. In one implementation, the processing unit uses bloom filters to detect register thrashing. In other implementations, other techniques for detecting register thrashing can be employed. If register thrashing falls below the threshold for a given number of epochs (conditional block 830, "yes" leg), then the compute units switch back into LRU spilling mode (block 835) and then method 800 returns to conditional block 820. If register thrashing does not fall below the threshold for a given number of epochs (conditional block 830, "no" leg), then the compute units stay in spilling from the youngest workgroup mode (block 840) and then method 800 returns to conditional block 830.

Figure 9:
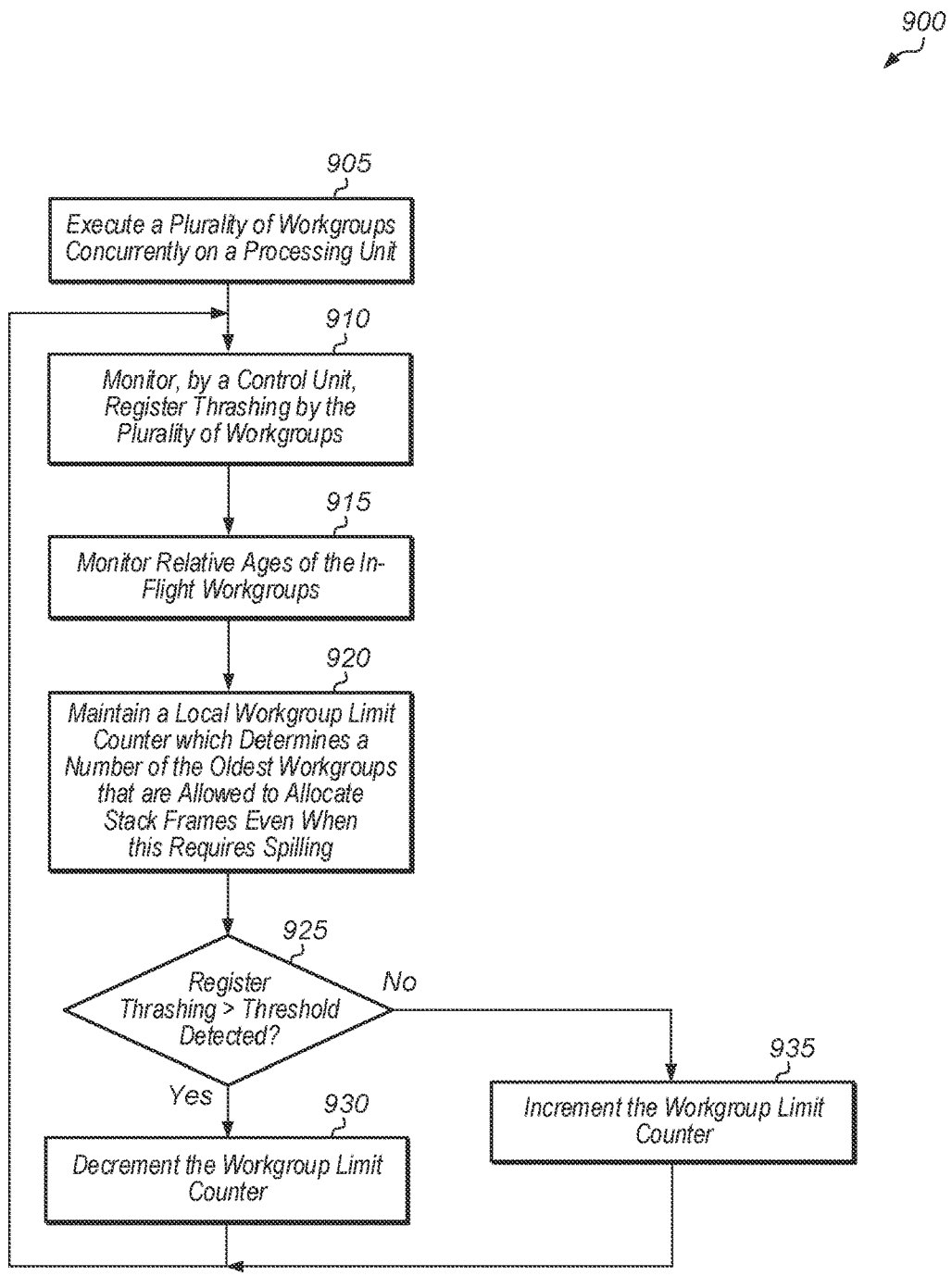
FIG. 9 is a generalized flow diagram illustrating one implementation of a method for determining workgroups that are allowed to cause spilling.

Referring now to FIG. 9, one implementation of a method 900 for determining workgroups that are allowed to cause spilling is shown. A processing unit (e.g., GPU 205 of FIG. 2) executes a plurality of workgroups concurrently (block 905). A control unit (e.g., control unit 310 of FIG. 3) of the processing unit monitors register thrashing by the plurality of workgroups (block 910). For example, in one implementation, the control unit maintains a spill counter to monitor the number of register spills per epoch. In other implementations, the control unit uses other techniques for monitoring register thrashing. Also, the control unit monitors relative ages of the in-flight workgroups (block 915). Still further, the control unit maintains a local workgroup limit counter which determines a number of the oldest workgroups that are allowed to allocate stack frames even when this requires spilling (block 920). For example, when the local workgroup limit counter is equal to N, where N is a positive integer, the N oldest workgroups are allowed to allocate stack frames even when this requires spilling. Younger workgroups' frame are preferably spilled in these cases. In one implementation, younger workgroups are forbidden from causing another workgroup to spill. In another implementation, younger workgroups are forbidden from allocating stack frames altogether.

Next, if register thrashing above a certain threshold is detected (conditional block 925, "yes" leg), then the local workgroup limit counter is decremented (block 930). If the local workgroup limit counter is already at a minimum level, then the local workgroup limit counter can remain the same at block 930. If register thrashing below the threshold is detected (conditional block 925, "no" leg), then the local workgroup limit counter is incremented (block 935). If the local workgroup limit counter is already at a maximum level, then the local workgroup limit counter can remain the same at block 935. After blocks 930 and 935, method 900 returns to block 910.

Figure 10:
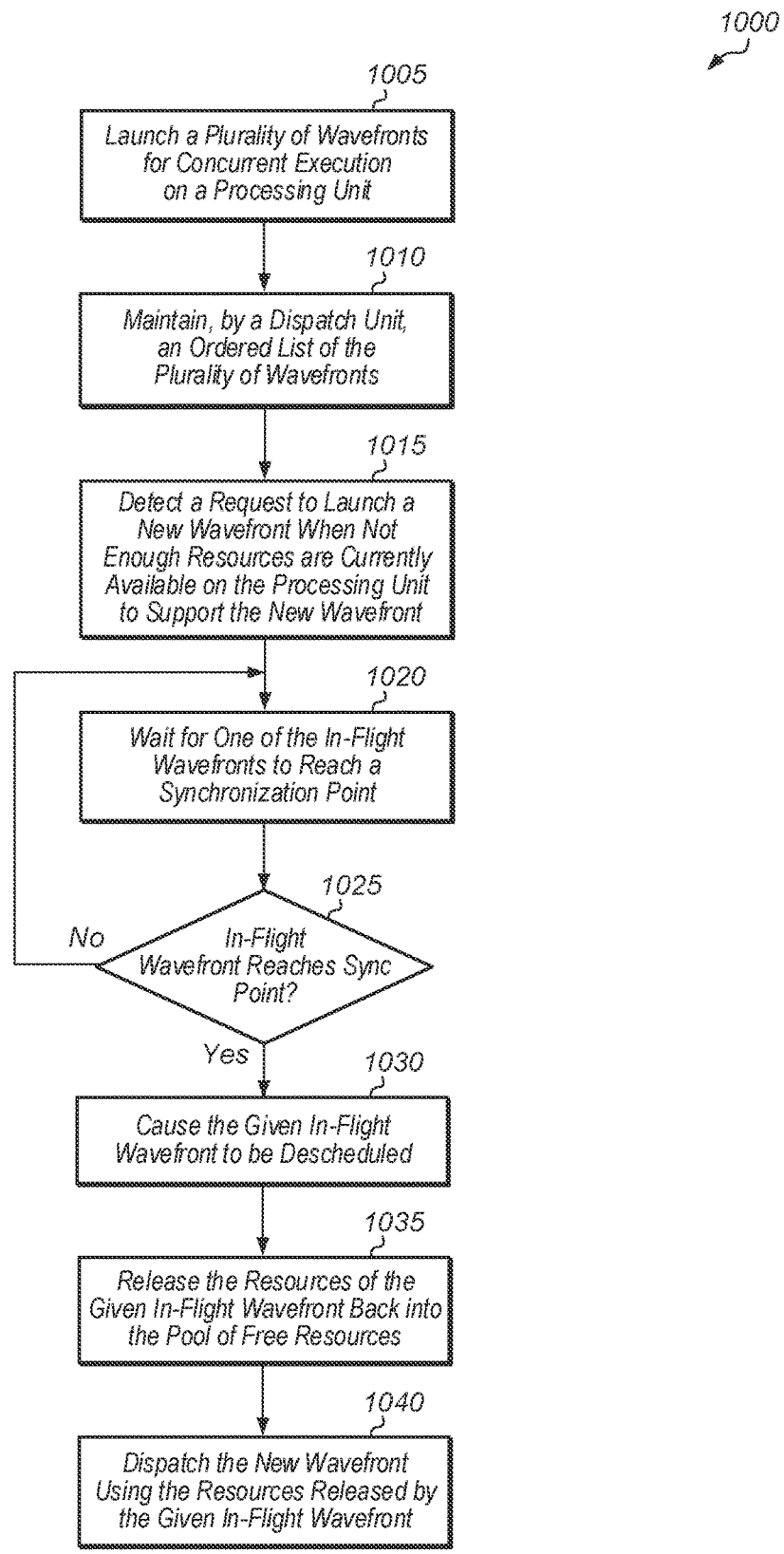
FIG. 10 is a generalized flow diagram illustrating one implementation of a method for cooperative wavefront scheduling.

Turning now to FIG. 10, one implementation of a method 1000 for cooperative wavefront scheduling is shown. A plurality of wavefronts are launched for concurrent execution on a processing unit (e.g., GPU 205 of FIG. 2) (block 1005). A dispatch unit (e.g., dispatch unit 305 of FIG. 3) maintains an ordered list of the plurality of wavefronts (block 1010). The dispatch unit detects a request to launch a new wavefront when not enough resources (e.g., registers) are currently available on the processing unit to support the new wavefront (block 1015). In response to there not being enough resources for the new wavefront, the dispatch unit waits for one of the in-flight wavefronts to reach a synchronization point (block 1020). Alternatively, the dispatch unit waits for one of the in-flight wavefronts to stall in block 1020. In one implementation, the synchronization point is a wavefront in a spin loop waiting for an atomic variable to be set. In another implementation, the synchronization point involves an in-flight wavefront waiting for a message. In a further implementation, the synchronization point involves an in-flight wavefront waiting for a long-latency memory request. In a still further implementation, the synchronization point is a barrier instruction. In other implementations, other types of synchronization points can be employed.

Once a given in-flight wavefront reaches a synchronization point (conditional block 1025, "yes" leg), the dispatch unit causes the given in-flight wavefront to be descheduled (block 1030). Also, the resources of the given wavefront are released back into the pool of free resources (block 1035). Next, the new wavefront is dispatched for execution by the dispatch unit using the resources released by the given wavefront (block 1040). After block 1040, method 1000 ends.

Figure 11:
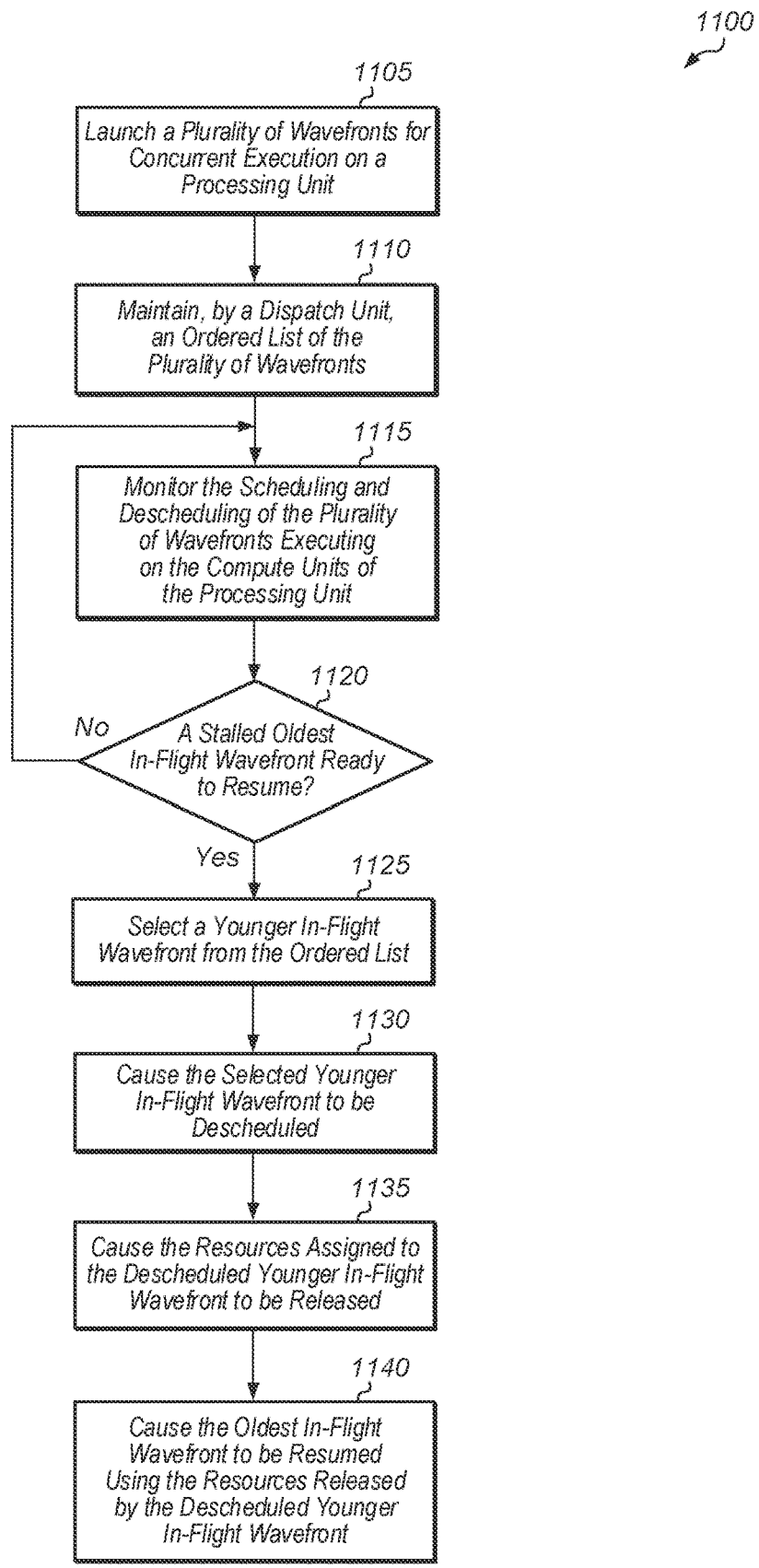
FIG. 11 is a generalized flow diagram illustrating one implementation of a method for wavefront descheduling and rescheduling.

Referring now to FIG. 11, one implementation of a method 1100 for wavefront descheduling and rescheduling is shown. A plurality of wavefronts are launched for concurrent execution on a processing unit (e.g., GPU) (block 1105). The plurality of wavefronts can be associated with any number of workgroups, from 1 to N, where N is a positive integer. A dispatch unit (e.g., dispatch unit 305 of FIG. 3) maintains an ordered list of the plurality of in-flight wavefronts (block 1110). In one implementation, the ordered list orders in-flight wavefronts by age. A control unit (e.g., control unit 310 of FIG. 3, control unit 400 of FIG. 4)

monitors the scheduling and descheduling of the plurality of wavefronts executing on the compute units of the processing unit (block 1115). If an oldest in-flight wavefront previously descheduled is now ready to resume execution (conditional block 1120, "yes" leg), then the control unit selects a younger in-flight wavefront from the ordered list (block 1125). The younger in-flight wavefront that is selected can be the youngest in-flight wavefront, the in-flight wavefront using the most resources, or the in-flight wavefront that meets other criteria. In one implementation, the vector register file is a primary resource being optimized by method 1100.

Next, the control unit causes the selected younger in-flight wavefront to be descheduled (block 1130). The control unit causes the resources assigned to the younger descheduled in-flight wavefront to be released (block 1135). The control unit causes the oldest in-flight wavefront to be resumed using the resources released by the younger in-flight wavefront (block 1140). For example, in one implementation, the oldest in-flight wavefront uses physical registers previously allocated to the younger in-flight wavefront to restore values from cache/memory. After block 1140, method 1100 ends. By implementing method 1100, the oldest in-flight wavefront can be descheduled when waiting for a synchronization event without ultimately creating a deadlock situation. A deadlock could occur if the oldest in-flight wavefront is not brought back onto the machine to generate data needed by a younger in-flight wavefront. Method 1100 allows the oldest in-flight wavefront to be resumed after previously being descheduled. By descheduling older wavefronts that are stalled, younger wavefronts can be scheduled, allowing for better utilization of the machine.

Figure 12:
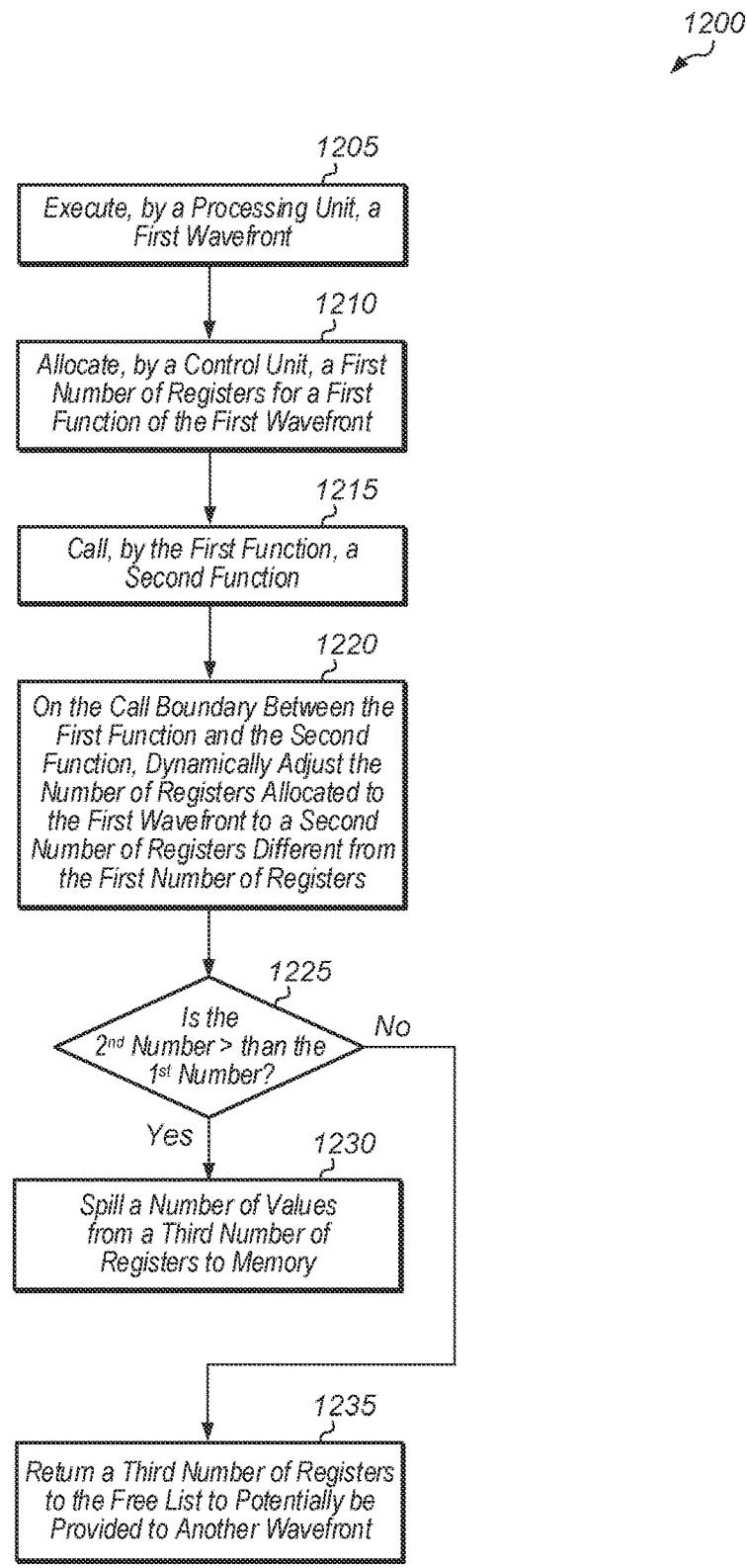
FIG. 12 is a generalized flow diagram illustrating one implementation of a method for dynamically adjusting register allocation on function boundaries.

Turning now to FIG. 12, one implementation of a method 1200 for dynamically adjusting register allocation on function boundaries is shown. A processing unit (e.g., GPU 205 of FIG. 2) executes a first wavefront (block 1205). A control unit (e.g., control unit 310 of FIG. 3, control unit 400 of FIG. 4) allocates a first number of registers for a first function of the first wavefront (block 1210). Next, the first function calls a second function (block 1215). On the call boundary between the first function and the second function, the control unit dynamically adjusts the number of registers allocated to the first wavefront to a second number of registers different from the first number of registers (block 1220). It is assumed for the purposes of this discussion that the second function needs or requests a different number of registers needed by the first function. In one implementation, an indication of the second number of registers needed by the second function is generated by a compiler as a compiler hint. In one implementation, the control unit detects the compiler hint responsive to the second function being called. In another implementation, the control unit dynamically adjusts the number of registers allocated to the first wavefront at a different point in time unrelated to the call boundary between the first function and the second function.

If the second number of registers is greater than the first number of registers (conditional block 1225, "yes" leg), then the control unit spills a number of values from a third number of registers to memory (block 1230). It is assumed for the purposes of this discussion that the third number is equal to the difference between the second number and the first number. In one implementation, the third number of registers are selected based on being allocated for a lowest one or more stack frames of all outstanding stack frames. Otherwise, if the second number of registers is less than or equal to the first number of registers (conditional block 1225, "no" leg), then the control unit returns a third number of registers to the free list to potentially be provided to another wavefront (block 1235). After blocks 1230 and 1235, method 1200 ends.

It is noted that method 1200 is an example of a method that can be implemented on call boundaries. It is also noted that method 1200 can be repeated at each call boundary when the number of registers allocated to the callee function is not equal to the number of registers allocated to the calling function.

Figure 13:
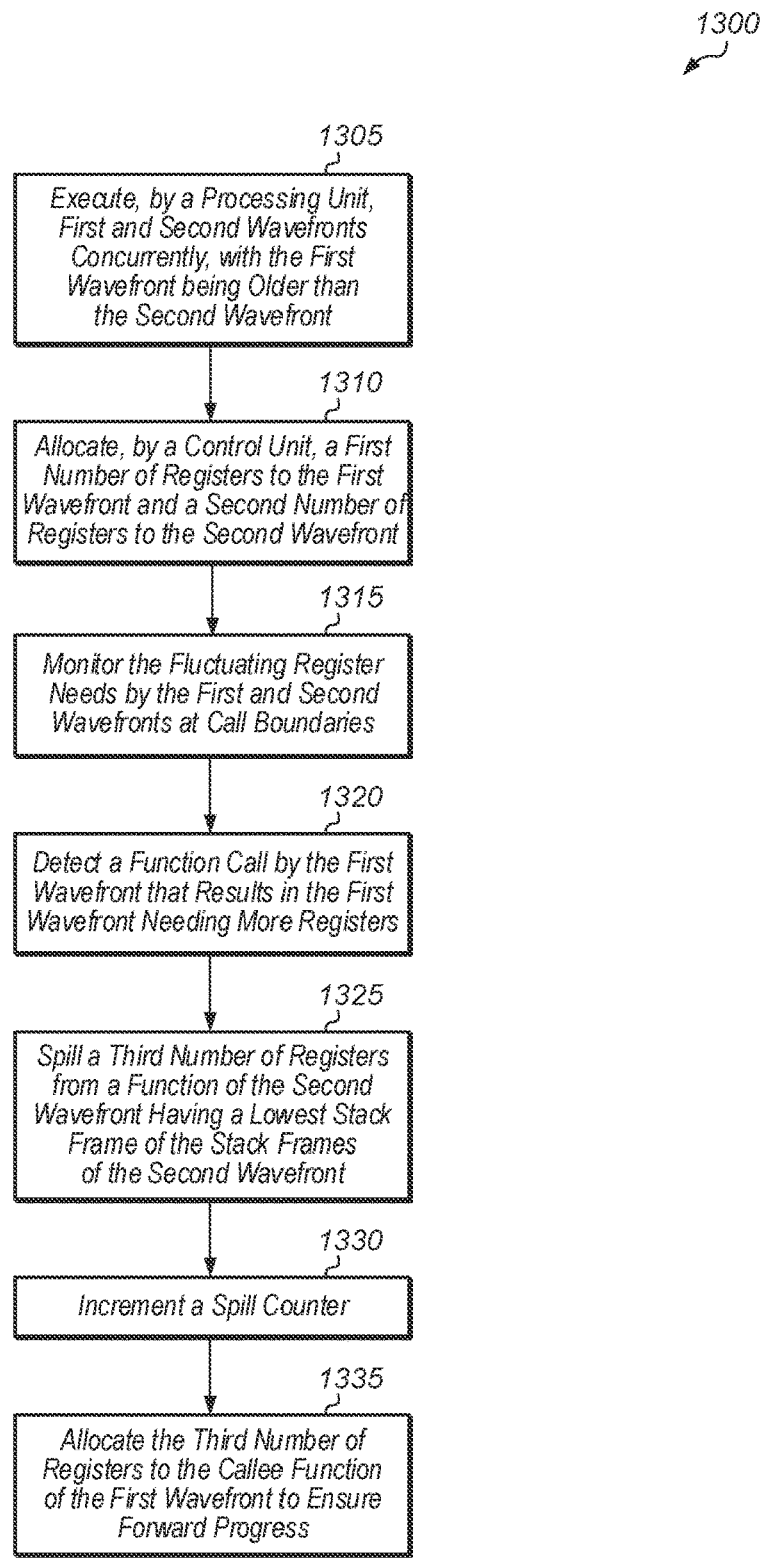
FIG. 13 is a generalized flow diagram illustrating one implementation of a method for dynamically allocating registers to ensure forward progress.

Referring now to FIG. 13, one implementation of a method 1300 for dynamically allocating registers to ensure forward progress is shown. A processing unit (e.g., GPU 205 of FIG. 2) executes first and second wavefronts concurrently, with the first wavefront being older than the second wavefront (block 1305). A control unit (e.g., control unit 310 of FIG. 3) allocates a first number of registers to the first wavefront and a second number of registers to the second wavefront (block 1310). The control unit monitors the fluctuating register needs by the first and second wavefronts at call boundaries (block 1315). During execution, the control unit detects a function call by the first wavefront that results in the first wavefront needing more registers (block 1320). In response to detecting the function call by the first wavefront that results in the first wavefront needing more registers, the control unit spills a third number of registers from a function of the second wavefront having a lowest stack frame of the stack frames of the second wavefront (block 1325). In other implementation, other selection criteria can be used to select which registers are spilled to memory. For example, in another implementation, the wavefront with the shortest stack is selected for spilling registers to memory. Also, the control unit increments a spill counter (block 1330). It is noted that the spill counter can be compared to a spill threshold periodically so as to adjust the number of wavefronts that are permitted to execute on the machine. Next, the control unit allocates the third number of registers to the callee function of the first wavefront to ensure forward progress (block 1335). After block 1335, method 1300 ends.

Figure 14:
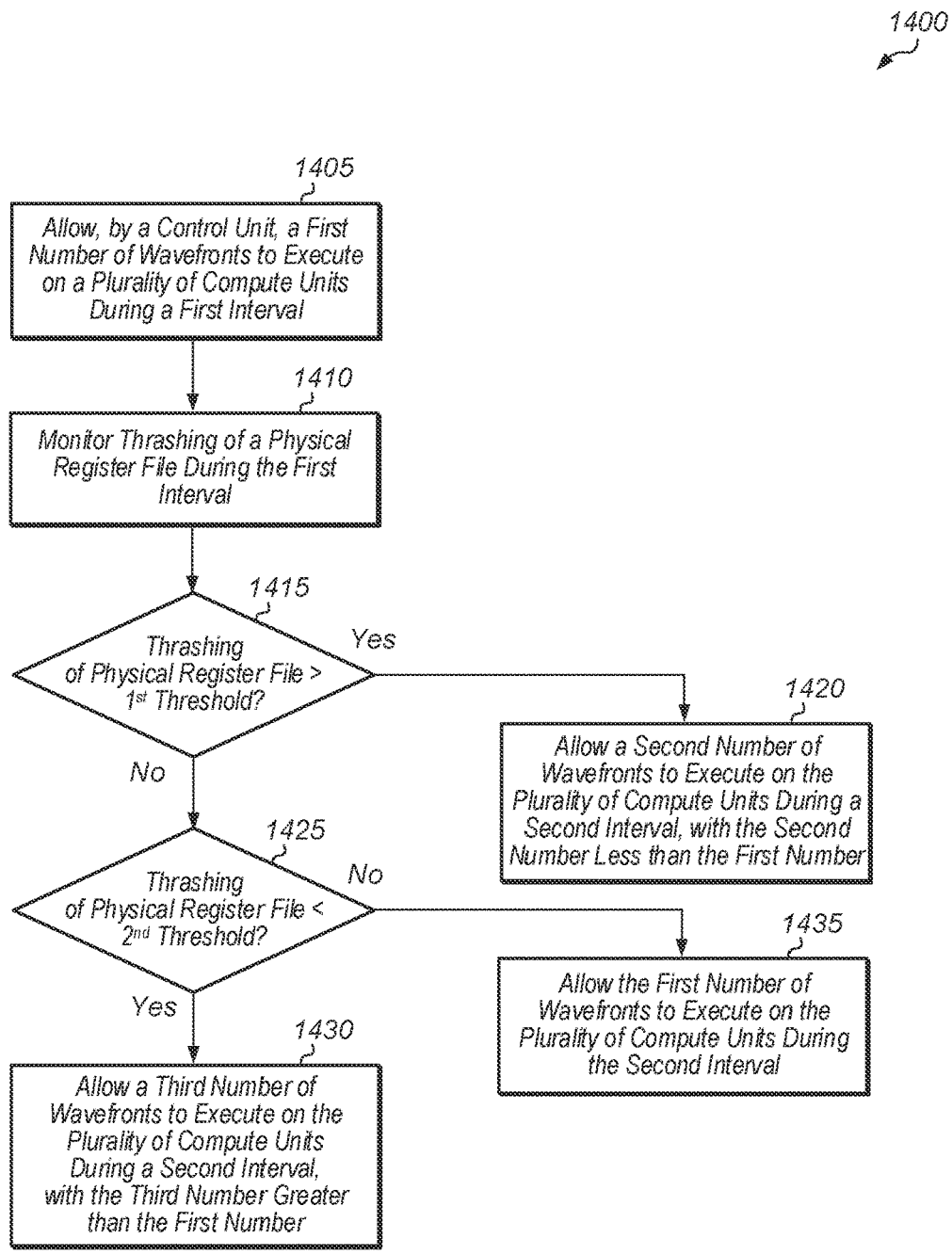
FIG. 14 is a generalized flow diagram illustrating one implementation of a method for dynamically adjusting wavefronts executing per epoch based on an amount of register threshing.

Turning now to FIG. 14, one implementation of a method 1300 for dynamically adjusting wavefronts executing per epoch based on an amount of register threshing is shown. A control unit (e.g., control unit 310 of FIG. 3) allows a first number of wavefronts to execute on a plurality of compute units (e.g., compute units 255A-N of FIG. 2) during a first interval (block 1405). The duration of the interval can vary according to the implementation. The control unit monitors thrashing of a physical register file during the first interval (block 1410). In one implementation, the control unit maintains a spill counter which is incremented each time a frame of registers is spilled to memory. In other implementations, the control unit uses other techniques for monitoring register thrashing. If the thrashing of the physical register file exceeds a first threshold (conditional block 1415, "yes" leg), then the control unit allows a second number of wavefronts to execute on the plurality of compute units during a second interval, with the second number being less than the first number (block 1420). It is assumed for the purposes of this discussion that the second interval is subsequent to the first interval.

If the thrashing of the physical register file is less than a second threshold (conditional block 1425, "yes" leg), then the control unit allows a third number of wavefronts to execute on the plurality of compute units during the second interval, with the third number being greater than the first number (block 1430). It is assumed for the purposes of this discussion that the second threshold is less than the first threshold. Otherwise, if the thrashing of the physical register file is in between the first and second thresholds (conditional block 1425, "no" leg), then the control unit allows the first number of wavefronts to execute on the plurality of compute units during the second interval (block 1435). After blocks 1420, 1430, and 1435, method 1400 ends. It is noted that method 1400 can be repeated in subsequent intervals to adjust the number of wavefronts that are allowed to execute concurrently on the compute units.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a register file; and
a control unit configured to:
monitor wavefronts dispatched for execution to a plurality of compute units;
store stack frames in one or more locations of the register file;
in response to a determination that a given stack frame requires more registers than are currently available in the register file:
spill one or more register values corresponding to one or more stack frames from the register file to memory, based at least in part on an age of the one or more stack frames; and
store at least a portion of the given stack frame for a given function in register locations freed up by spilling the one or more register values to the memory.

2. The apparatus as recited in claim 1, wherein the control unit is further configured to:
assign a first number of registers to a first wavefront during execution of a first function;
detect a second function called by the first function; and
assign a second number of registers to the first wavefront during execution of the second function, wherein the second number is different from the first number.

3. The apparatus as recited in claim 1, wherein the control unit is further configured to select, from a plurality of stack frames corresponding to older functions, a stack frame of an oldest function to spill to the memory if the given stack frame of the given function requires more registers than are currently available in the register file.

4. The apparatus as recited in claim 3, wherein the control unit is further configured to:
increment a spill counter responsive to spilling, to the memory, the stack frame of the oldest function;
compare the spill counter to a register spill threshold at an end of a current epoch; and
reduce a number of wavefronts that are allowed to be dispatched in a subsequent epoch responsive to the spill counter being greater than the register spill threshold.

5. The apparatus as recited in claim 4, wherein the control unit is further configured to increment a spill counter each time any stack frame is spilled to the memory from the register file.

6. The apparatus as recited in claim 1, wherein the control unit is further configured to reduce a number of wavefronts that are allowed to be dispatched, responsive to a number of stack frames spilled being greater than a register spill threshold.

7. The apparatus as recited in claim 1, wherein the one or more register values spilled to memory correspond to a first stack frame of a first function of a first wavefront, and wherein the given stack frame of the given function corresponds to a second wavefront different from the first wavefront.

8. A method comprising:
monitoring, by a control unit, wavefronts dispatched for execution to a plurality of compute units;
storing a corresponding stack frame on a physical register file;
in response to a determination that a given stack frame requires more registers than are currently available in the physical register file:
spill one or more register values corresponding to one or more stack frames from the physical register file to memory, based at least in part on an age of the one or more stack frames; and
store at least a portion of the given stack frame for a given function in register locations freed up by spilling the one or more register values to the memory.

9. The method as recited in claim 8, further comprising:
assigning a first number of registers to a first wavefront during execution of a first function;
detecting a second function called by the first function; and
assigning a second number of registers to the first wavefront during execution of the second function, wherein the second number is different from the first number.

10. The method as recited in claim 8, further comprising selecting, from a plurality of stack frames corresponding to older functions, a stack frame of an oldest function to spill to the memory if the given stack frame of the given function requires more registers than are currently available in the physical register file.

11. The method as recited in claim 10, further comprising:
incrementing a spill counter responsive to spilling, to the memory, the stack frame of the oldest function;
comparing the spill counter to a register spill threshold at an end of a current epoch; and
reducing a number of wavefronts that are allowed to be dispatched in a subsequent epoch responsive to the spill counter being greater than the register spill threshold.

12. The method as recited in claim 11, further comprising incrementing the spill counter each time any stack frame is spilled to the memory from the physical register file.

13. The method as recited in claim 11, further comprising incrementing the spill counter for spilled stack frames corresponding to a plurality of different workgroups.

14. The method as recited in claim 8, wherein the one or more register values spilled to memory correspond to a first stack frame of a first function of a first wavefront, and wherein the given stack frame of the given function corresponds to a second wavefront different from the first wavefront.

15. A system comprising:
a physical register file comprising a plurality of registers;
a plurality of compute units;
a dispatch unit; and
a control unit configured to:
store stack frames corresponding to wavefronts in one or more locations of the physical register file;
in response to a determination that a given stack frame requires more registers than are currently available in the physical register file:
spill one or more register values corresponding to one or more stack frames from the physical register file to memory, based at least in part on an age of the one or more stack frames; and
store at least a portion of the given stack frame for a given function in register locations freed up by spilling the one or more register values to the memory.

16. The system as recited in claim 15, wherein the control unit is further configured to:
assign a first number of registers to a first wavefront during execution of a first function;
detect a second function called by the first function; and
assign a second number of registers to the first wavefront during execution of the second function, wherein the second number is different from the first number.

17. The system as recited in claim 15, wherein the control unit is further configured to select, from a plurality of stack frames corresponding to older functions, a stack frame of an oldest function to spill to the memory if the given stack frame of the given function requires more registers than are currently available in the physical register file.

18. The system as recited in claim 17, wherein the control unit is further configured to:
increment a spill counter responsive to spilling, to the memory, a first number of registers used by the stack frame of the oldest function;
compare the spill counter to a register spill threshold at an end of a current epoch; and
reduce a number of wavefronts that are allowed to be dispatched in a subsequent epoch responsive to the spill counter being greater than the register spill threshold.

19. The system as recited in claim 18, wherein the control unit is further configured to increment the spill counter each time any stack frame is spilled to the memory from the physical register file.

20. The system as recited in claim 19, wherein the control unit is further configured to increment the spill counter for spilled stack frames corresponding to a plurality of different workgroups.

* * * * *